(12) United States Patent
Sarma et al.

(10) Patent No.: US 7,631,021 B2
(45) Date of Patent: Dec. 8, 2009

(54) APPARATUS AND METHOD FOR DATA REPLICATION AT AN INTERMEDIATE NODE

(75) Inventors: Joydeep Sarma, Sunnyvale, CA (US); Michael Federwisch, San Jose, CA (US); Steven Watanabe, San Jose, CA (US); Alan Lawson Rowe, San Jose, CA (US)

(73) Assignee: Netapp, Inc., Sunnyvale, CA (US)

( * ) Notice: Subject to any disclaimer, the term of this patent is extended or adjusted under 35 U.S.C. 154(b) by 283 days.

(21) Appl. No.: 11/090,829

(22) Filed: Mar. 25, 2005

(65) Prior Publication Data

US 2006/0218210 A1    Sep. 28, 2006

(51) Int. Cl.
  G06F 17/30    (2006.01)
  G06F 15/16    (2006.01)
  G06F 7/00    (2006.01)
(52) U.S. Cl. .................. 707/204; 707/10; 707/102; 709/231
(58) Field of Classification Search .............. 707/10, 707/201; 370/216, 230, 400, 401; 709/229
See application file for complete search history.

(56) References Cited

U.S. PATENT DOCUMENTS

| | | | | |
|---|---|---|---|---|
| 5,400,329 A * | 3/1995 | Tokura et al. | ............... | 370/232 |
| 5,541,927 A * | 7/1996 | Kristol et al. | ............... | 370/408 |
| 5,884,308 A * | 3/1999 | Foulston | ................. | 707/8 |
| 5,905,874 A * | 5/1999 | Johnson | ................. | 709/250 |
| 5,937,414 A * | 8/1999 | Souder et al. | .............. | 707/203 |
| 5,970,488 A * | 10/1999 | Crowe et al. | .................. | 707/8 |
| 6,161,160 A * | 12/2000 | Niu et al. | ..................... | 710/310 |
| 6,167,438 A * | 12/2000 | Yates et al. | .................. | 709/216 |
| 6,205,481 B1 * | 3/2001 | Heddaya et al. | ............. | 709/226 |
| 6,269,085 B1 * | 7/2001 | Provino et al. | .............. | 370/256 |
| 6,353,836 B1 * | 3/2002 | Bamford et al. | ............. | 707/203 |
| 6,424,626 B1 * | 7/2002 | Kidambi et al. | ............. | 370/236 |
| 6,449,622 B1 * | 9/2002 | LaRue et al. | ................ | 707/201 |
| 6,477,143 B1 * | 11/2002 | Ginossar | .................... | 370/230 |
| 6,751,746 B1 * | 6/2004 | Jain et al. | ..................... | 714/4 |
| 6,859,865 B2 * | 2/2005 | De Margerie et al. | ....... | 711/162 |
| 7,162,467 B2 * | 1/2007 | Eshleman et al. | .............. | 707/3 |
| 7,177,886 B2 * | 2/2007 | Pruet, III | .................... | 707/204 |
| 7,321,906 B2 * | 1/2008 | Green | ........................ | 707/204 |
| 2002/0031131 A1 * | 3/2002 | Yemini et al. | ................ | 370/401 |
| 2002/0116457 A1 * | 8/2002 | Eshleman et al. | ........... | 709/203 |
| 2002/0163910 A1 * | 11/2002 | Wisner et al. | ............... | 370/389 |
| 2003/0120917 A1 * | 6/2003 | Itonaga et al. | ............... | 713/163 |
| 2003/0204626 A1 * | 10/2003 | Wheeler | ..................... | 709/245 |
| 2004/0184402 A1 * | 9/2004 | Alicherry et al. | ............ | 370/216 |

(Continued)

*Primary Examiner*—Miranda Le
(74) *Attorney, Agent, or Firm*—Perkins Coie LLP

(57) ABSTRACT

An embodiment of the invention provides an apparatus that includes a primary node, a secondary node, and an intermediate node. Data is synchronously copied from the primary node to the intermediate node, and data is asynchronously copied from the intermediate node to the secondary node. The data stored in the intermediate node is a subset of the data set that is stored in the primary node. Therefore, an embodiment of the invention advantageously provides a multiple hop data replication method that allows data recovery if disaster occurs at the location of the primary node. Additionally, an embodiment of the invention advantageously provides a tolerable latency value from the time that a client device sends a write request to the primary node to the time that an acknowledgement message is received by the client device.

39 Claims, 5 Drawing Sheets

U.S. PATENT DOCUMENTS

| | | | |
|---|---|---|---|
| 2005/0114285 A1* | 5/2005 | Cincotta | 707/1 |
| 2005/0132074 A1* | 6/2005 | Jones et al. | 709/229 |
| 2005/0141458 A1* | 6/2005 | Franzen | 370/332 |
| 2006/0056421 A1* | 3/2006 | Zaki | 370/400 |
| 2006/0120411 A1* | 6/2006 | Basu et al. | 370/539 |
| 2007/0177739 A1* | 8/2007 | Ganguly et al. | 380/277 |

* cited by examiner

APPARATUS AND METHOD FOR DATA REPLICATION AT AN INTERMEDIATE NODE

TECHNICAL FIELD

Embodiments of the invention relate generally to storage networks, and more particularly to an apparatus and method for data replication at an intermediate node.

BACKGROUND

Storage devices are employed to store data that are accessed by computer systems. Examples of storage devices include volatile and non-volatile memory, floppy drives, hard disk drives, tape drives, optical drives, or other types of storage units. A storage device may be locally attached to an input/output (I/O) channel of a computer. For example, a hard disk drive may be connected to a computer's disk controller.

A storage device may also be accessible over a network. Examples of such a storage device include network attached storage (NAS) and storage area network (SAN) devices. A storage device may be a single stand-alone component or may include a system of storage devices such as in the case of Redundant Array Of Inexpensive Disks (RAID) groups and some Direct Access Storage Devices (DASD). Generally, disk storage is typically implemented as one or more storage "volumes" (i.e., data volumes) that are formed by physical storage disks and define an overall logical arrangement of the storage space. Each volume is typically associated with its own file system. The storage disks within a volume may be typically organized as one or more groups of RAID.

For mission-critical applications requiring high availability of stored data, various techniques for enhancing data reliability are typically employed. One such technique is to provide a "mirror" for each storage device. In a mirror arrangement, data are written to at least two storage devices. Thus, identical data may be read from either of the two storage devices so long as the two devices are operational and contain the same data. In other words, either of the two storage devices may process the read requests so long as the two storage devices are in synchronization. Synchronous mirroring applications are typically used to achieve data synchronization between the two storage devices.

Common synchronous mirroring applications require client transactions to be committed locally (at a primary or first site) and to be committed remotely (at a backup or secondary site) before a transaction is deemed to be committed and acknowledged to a client device. In other words, client transactions are usually performed on the primary site and the backup site. However, high latency is inherent in these applications that use synchronous mirroring applications. Relaying the client transaction from the primary site to the backup site, and sending an acknowledgement of the transaction completion from the backup site to the primary site and then to the client device will incur a latency value equal to the round trip transmission time (RTT) concerning the transaction. This latency value is directly proportional to the distance between the primary site and backup site, with the two sites being related by the speed of light (which is an invariant). In implementations where the primary site and the backup site are separated by a far distance, this latency value adds a significant delay to the client response time, and this delay can greatly degrade the application performance.

Therefore, the current technology is limited in its capabilities and suffers from at least the above constraints and deficiencies.

SUMMARY OF EMBODIMENTS OF THE INVENTION

An embodiment of the invention advantageously solves the high latency problem that is inherent in most current disaster recovery solutions. An embodiment of the invention may be used in, for example, synchronous mirroring applications or/and applications that replicate (duplicate or copy) user data to a remote site.

An embodiment of the invention provides an apparatus (system) that includes a primary node, a secondary node, and an intermediate node. Data is synchronously copied from the primary node to the intermediate node, and data is asynchronously copied from the intermediate node to the secondary node. The data stored in the intermediate node is a subset of the data set that is stored in the primary node. Therefore, an embodiment of the invention advantageously provides a multiple hop data replication method that allows data to be replicated (copied or duplicated) from a primary node to an intermediate node and then replicated to a secondary node, and allows data recovery if disaster occurs at the location of the primary node. Additionally, an embodiment of the invention advantageously provides a tolerable latency value from the time that a client device sends a write request to the primary node to the time that an acknowledgement message is received by the client device.

As one of various options, the transactions via a link between the primary node and the secondary node may be, for example, compressed or encrypted (end-end), in accordance with standard compression or encryption techniques.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
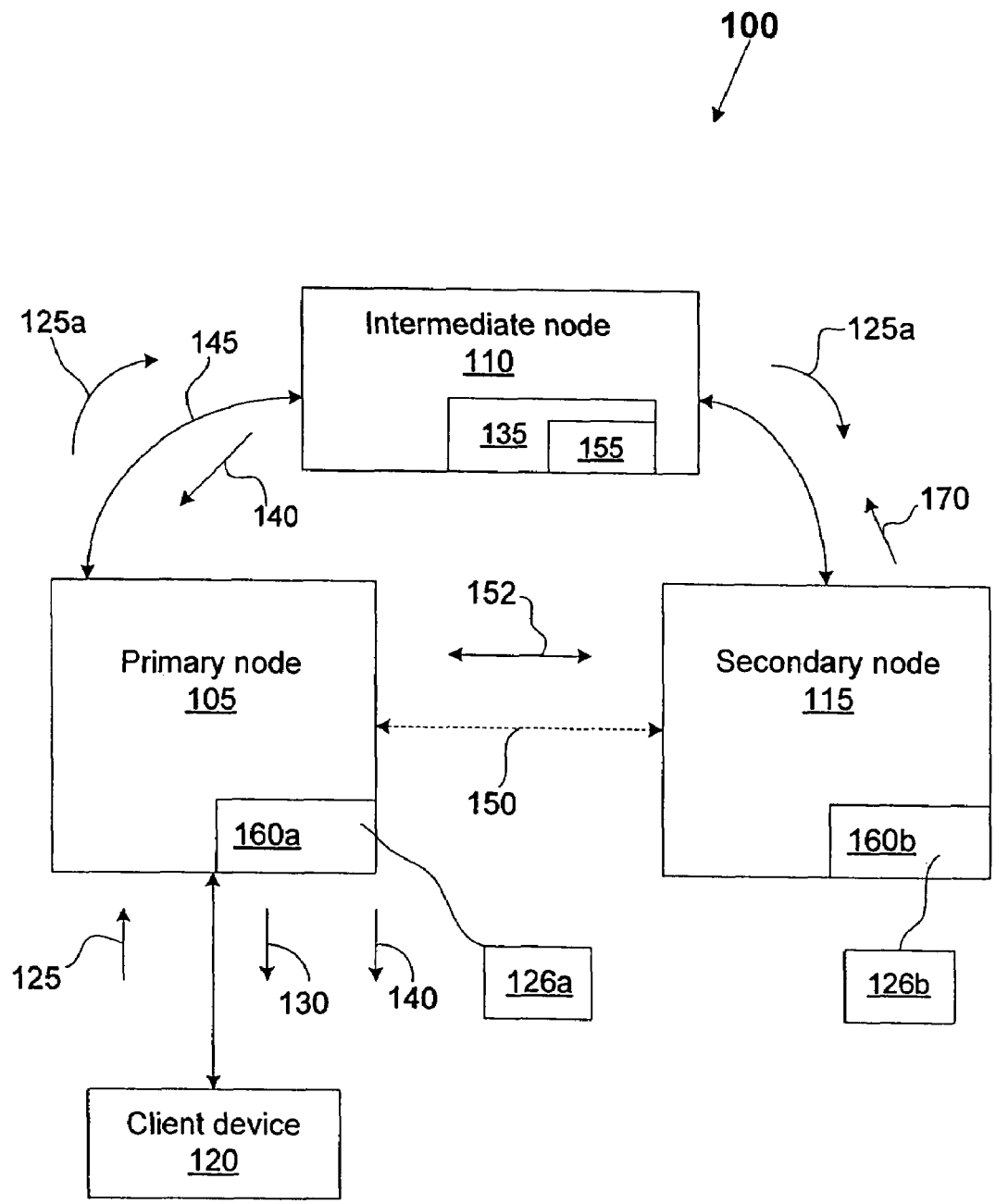
FIG. 1 is a block diagram of a system, in accordance with an embodiment of the invention.

FIG. 1 is a block diagram of a system 100 (or apparatus or data storage system), in accordance with an embodiment of the invention. The system 100 includes a primary node 105, an intermediate node 110, and a secondary node 115. The secondary node 115 is typically located at a site that is remote (i.e., is in a different location) from the primary node 105. The secondary node 115 stores the data set 160b which is a backup copy of the data set 160a that is stored in the primary node 105. The primary node 105 and/or the secondary node 115 may be, for example, a filer that provides data storage services over a network (including data storage and data management features) and processes read and write request from a computer. One example of a filer is of the type commercially available from NETWORK APPLIANCE, INCORPORATED. However, the primary node 105 and the secondary node 115 are not necessarily limited to filers, and the primary node 105 and the secondary node 115 may be other suitable types of devices that can provide data storage and data management features.

A client device 120 can send write requests in order to write data 125 into the primary node 105. The data 125 is typically sent as a data stream from the client device 120 to the primary node 105. The client device 120 can also send read requests in order to read data 130 from the primary node 105. The data 130 is typically sent as a data stream from the primary node 105 to the client device 120. As an example, the client device 120 may be, without limitation, a personal computer, server, mini-computer, mainframe computer, portable computer such as a laptop or notebook computer, workstation, wireless terminal, personal digital assistant, cellular phone, or another type of processing device. In accordance with an embodiment of the invention, when the client device 120 sends the data 125 to be written to the primary node 105, the primary node 105 will receive and store the data 125. As an example, the data 125 creates a file (or folder) 126a that is stored in the primary node 105, or updates a file or folder 126a. Therefore, the data 125 becomes part of the data set 160a in the primary node 105. The primary node 105 will also send a copy 125a of the data 125 to the intermediate node 110. After the intermediate node 110 receives the data copy 125a, the intermediate node 110 will store or buffer the data copy 125a in a buffer space 135, as discussed in further detail below. When the data copy 125a is stored in the buffer space 135, the data copy 125a is now stored in a storage device in the intermediate node 110. After a copy 125a of the data 125 is stored in the buffer space 135, the intermediate node 110 will then send an acknowledgment message 140 in order to indicate or confirm that the data copy 125a has been successfully stored in the intermediate node 110. Therefore, the data copy 125a is not required to reach the secondary node 115 in order to send an acknowledgment message 140, and as a result, the use of the intermediate node 110 in the system 100 avoids the latency effects of the acknowledgment messages in the previous approaches. The primary node 105 will then receive the acknowledgment message 140. Upon receipt of acknowledgement 140 by the primary node 105 from the intermediate node 110, the primary node 105 acknowledges the completion of the transaction to the client device 120 (i.e., acknowledges the buffering of the data 125a into the intermediate node 110). Typically, this acknowledgement of the completion of the transaction is performed by forwarding the acknowledgment message 140 from the primary node 105 to the client device 120, although other methods may be used by the primary node 105 to acknowledge the completion of the transaction. When the client device 120 receives the acknowledgment of the transaction completion from the primary node 105, the client device 120 can proceed onwards to perform known operations. An example of an operation when the client device 120 proceeds onwards after receiving the transaction acknowledgement is as follows. Some Network File System (NFS) clients will typically wait for an acknowledgement in response to a new file creation request to a Filer (e.g., primary node 105) before issuing writes against such a file. Typically, users of client computers 120 are unaware of the fact that there is a backup copy. The additional latency hit for the client device 120 is now a function of the distance between the primary node 105 and the intermediate node 110.

In an embodiment of the invention, the intermediate node 110 also forwards the copy 125a of the data 125 to the secondary node 115, so that the secondary node 115 can store a backup copy of the data 125. Therefore, the intermediate node 110 functions as a device that stores data and forwards data, and as an intermediate-hop device between the primary node 105 and the secondary node 115. The intermediate node 110 typically sends the copy 125a of data 125 to the secondary node 115 during a background operation of the intermediate node 110 or during a later time, although the intermediate node 110 can send the data copy 125a to the secondary node 115 immediately or in real-time or by any other suitable known manner. There may also be a time delay in the transmission of the copy 125a of data 125 from the intermediate node 110 to the secondary node 115. Therefore, data is synchronously copied from the primary node 105 to the intermediate node 110, and data is asynchronously copied from the intermediate node 110 to the secondary node 115. As an example, the data copy 125a creates a file (or folder) 126b in the secondary node 115, where the file (or folder) 126b is a copy of the file (or folder) 126a in the primary node 115. As another example, the data copy 125 updates the file or folder 126b in the secondary node 115. The intermediate node 110 and secondary node 115 provide a multiple hop configuration and solution for replicating data that is useful in disaster recovery applications. In other words, the data 125 is written by the client device 120, and the data 125 is copied (replicated) into the intermediate node 110 as data 125a. The data 125a is then copied (replicated) into the secondary node 115.

Note that the intermediate node 110 stores, in the buffer space 135, data 155 which is a less than a full copy of the files or data set 160a which are stored in the primary node 105. All that needs to be stored is the data which has been received by the intermediate node 110 and not yet sent to the secondary node 115. In other words, the data 155 in the buffer space 135 is a subset of the data in the data set 160a. As an example, the data set 160a may have a total size of approximately 1000 gigabytes or more, while the data 155 may only be approximately 3 gigabytes of the data in the data set 150a. As discussed below, the size of the data 155 in the buffer space 135 may be at other values. At a minimum, the data 155 buffered in the buffer space 135 is the data 125 that is written by the client device 120 into the primary node 105. Note that the data 125 will be a subset of the data set 160a when the client device 120 writes the data 125 into the primary node 105. Note also that the entire data in the data set 160a is not stored in the buffer space 135 at any particular time, due to the limited size of the buffer space 135. As an end result of the above process, the files or data set 160a are eventually copied as data set copy 160b in the secondary node 115.

After the data copy 125a is stored in the secondary node 115, the second node 115 sends a confirmation message 170 to the intermediate node 110, where the confirmation message 170 indicates that the data has been stored in the secondary node 115. After receiving the confirmation message 170 and in response to the confirmation message 170, the intermediate node 110 typically deletes the data 125a in the buffer space 135, in order to free memory space in the buffer space 135, in one embodiment of the invention.

Two factors are typically used, for example, in determining the distance between the primary node 105 and the intermediate node 110. First, the intermediate node 110 is typically located outside of a "crater zone" for purposes of disaster recovery consideration. In other words, the intermediate node 110 is typically located sufficiently far away from the primary node 105, so that the intermediate node 110 is not affected by any disaster that affects the primary node 105. Second, the distance 145 between the primary node 105 and the intermediate node 110 is such that the latency hit for the clients 120 is tolerable (i.e., does not greatly degrade application performance). In other words, the distance 145 provides a tolerable latency value from the time that the client device 120 sends a write request to the primary node 105 to the time that the acknowledgement message 140 is received by the client device 120.

In the multiple hop solution provided by the system 100, as long as the disaster does not encompass both the primary node 105 and intermediate node 110, a synchronous copy of the user data 125 is available at the secondary node (backup site) 115, eventually, since data 125 is asynchronously copied from the intermediate node 110 to the secondary node 115. The synchronous copy of the user data 125 at the secondary node 115 is the end result of the user data 125 transmitting (draining) from the intermediate node 110 to the secondary node 115. This scheme is very beneficial because it separates the location of the primary node 105 and secondary node 115 from the latency and disaster tolerance requirements of synchronous mirroring. The primary node 105 and secondary node 115 are typically, for example, data centers. The primary node 105 and secondary node 115 are often dictated by the different geographical areas where an entity (e.g., corporation) may have offices, as an example.

The network connectivity between the primary node 105 and the intermediate node 110, and between the intermediate node 110 and the secondary node 115 may use any suitable types of standard network connections and protocols such as, for example, TCP/IP (Transmission Control Protocol/Internet Protocol) and/or Ethernet, or Fibre Channel.

Typically, there is also an alternate link connectivity 150 between the primary node 105 and the secondary node 115. The link 150 can be used for the purpose of direct communication between the primary node 105 and the secondary node 115. Direct communication between the primary node 105 and the secondary node 115 is useful when the intermediate node 110 is down or is unavailable for communication in the network or system 100.

An issue with other or conventional multi-hop solutions for data replication, on the other hand, is that these types of solutions usually require a full copy of the data at an intermediate node. As the user data 155 keeps accumulating in the buffer space 135, this issue may affect system performance. Furthermore, the intermediate node 110 is typically not a full fledged data center. One example of a conventional multi-hop solution is provided by NETWORK APPLIANCE, INCORPORATED, and utilizes the SYNC SNAPMIRROR™ (SLIDERULER™) and ASYNC SNAPMIRROR™ products which are commercially available from NETWORK APPLIANCE, INC.

The conventional multi-hop solutions typically require at least three (3) copies of the same data (i.e., data set), and this configuration leads to additional expense, required management of an intermediate node that stores the full copy of the data set, and result in idle data that is stored in the intermediate node and that is not particularly useful. In contrast, an embodiment of the invention provides an intermediate node configuration that provides various advantages as described below.

The intermediate node 110 has a primary purpose of being able to facilitate a disaster recovery implementation. Managing a large amount of data at this intermediate node 110 (which is often a remote site) may be a problem in some situations, particularly if the stored data 155 increases in size. Also, the data 155 is also mostly sitting idle at the intermediate node 110 and is typically not useful to a customer. In order to solve these issues, the system 100 advantageously eliminates the requirement of storing a full copy of the data set 160a at the intermediate node 110 (and therefore eliminates or reduces the attendant cost and administrative problems with storing a full copy of the data set 160a), while providing all the benefits of a multi-hop disaster recovery solution and at a lower cost. In an embodiment of the invention, the intermediate node 110 is populated with a small amount of stable storage that forms the buffer space 135. Typically, this stable storage may be formed by, for example, NVRAM (non-volatile random access memory) and/or magnetic disk drives, and/or other suitable data storage devices. The buffered data 155 that is stored in the buffer space 135 is less or only a portion of the data set 160a in the primary node 105. A buffered data 155 is flushed from the intermediate node 110 and replaced with new data 125a, if there is not sufficient free memory space in the buffer space 135 for storing the new data 125a. The network of system 100 may, for example, be one of various types of communication networks such as wide area networks, local area networks, the Internet, or another type of network. Other nodes in the system 100 such as, for example, gateways, routers, bridges, switches, firewalls, and/or the like, are not depicted in FIG. 1 for clarity of illustration. Standard components are also not shown in the components in FIG. 1, in order to focus on the functionalities in the embodiments of the invention. The components shown in FIG. 1 are also not necessarily drawn to scale, for clarity of illustration.

Figure 2:
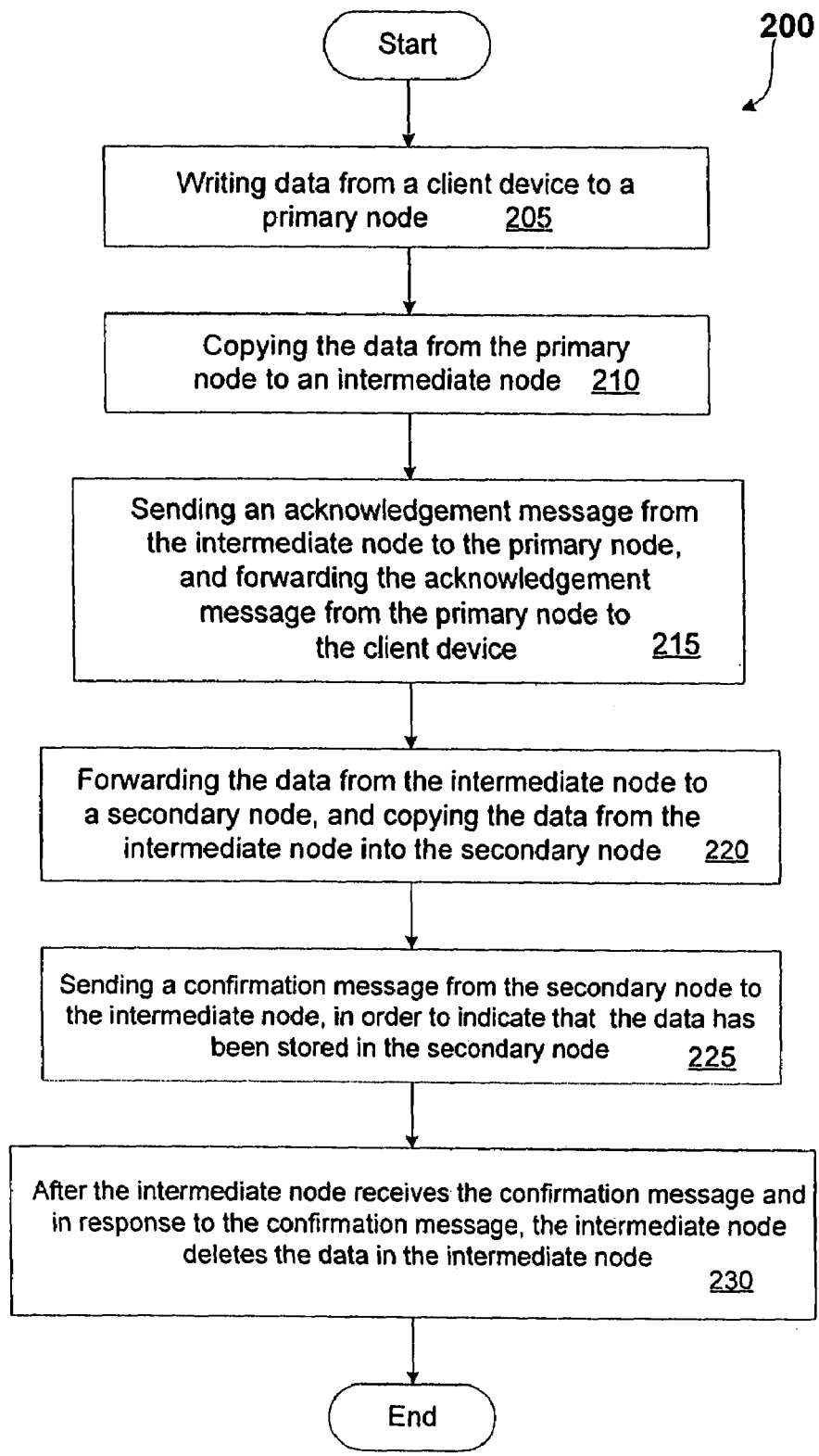
FIG. 2 is a flowchart of a method, in accordance with an embodiment of the invention.

FIG. 2 is a flowchart of a method 200, in accordance with an embodiment of the invention. In block 205, a client device writes data to a primary node via a write request. In block 210, the data is copied from the primary node to an intermediate node. In block 215, the intermediate node sends an acknowledgement message to the primary node, where the acknowledgement message indicates that the data has been successfully copied from the primary node to the intermediate node. In block 215, the acknowledgment message is also forwarded from the primary node to the client device. In block 220, the data is forwarded from the intermediate node to a secondary node. In block 220, the data from the intermediate node is also copied into the secondary node. Note that the steps in block 215 and 220 may be performed concurrently. Alternatively, the steps in block 220 may also be performed prior to performing the steps in block 215, but this approach may increase the transmission latency of the acknowledgement message from the intermediate node. Note also that the data 155 (FIG. 1) that is buffered in the intermediate node is less than a full copy of the data set 160a that is stored in the primary node 105 (i.e., the data 155 is a subset of the data set 160a). The data set 160a is copied in the secondary node 115 as a data set 160b.

In block 225, the secondary node 115 sends a confirmation message 170 to the intermediate node 110, where the confirmation message 170 indicates that the data has been stored in the secondary node 115. In block 230, after the intermediate node 110 receives the confirmation message 170 and in response to the confirmation message 170, the intermediate node 110 deletes the data in the intermediate node.

Figure 3:
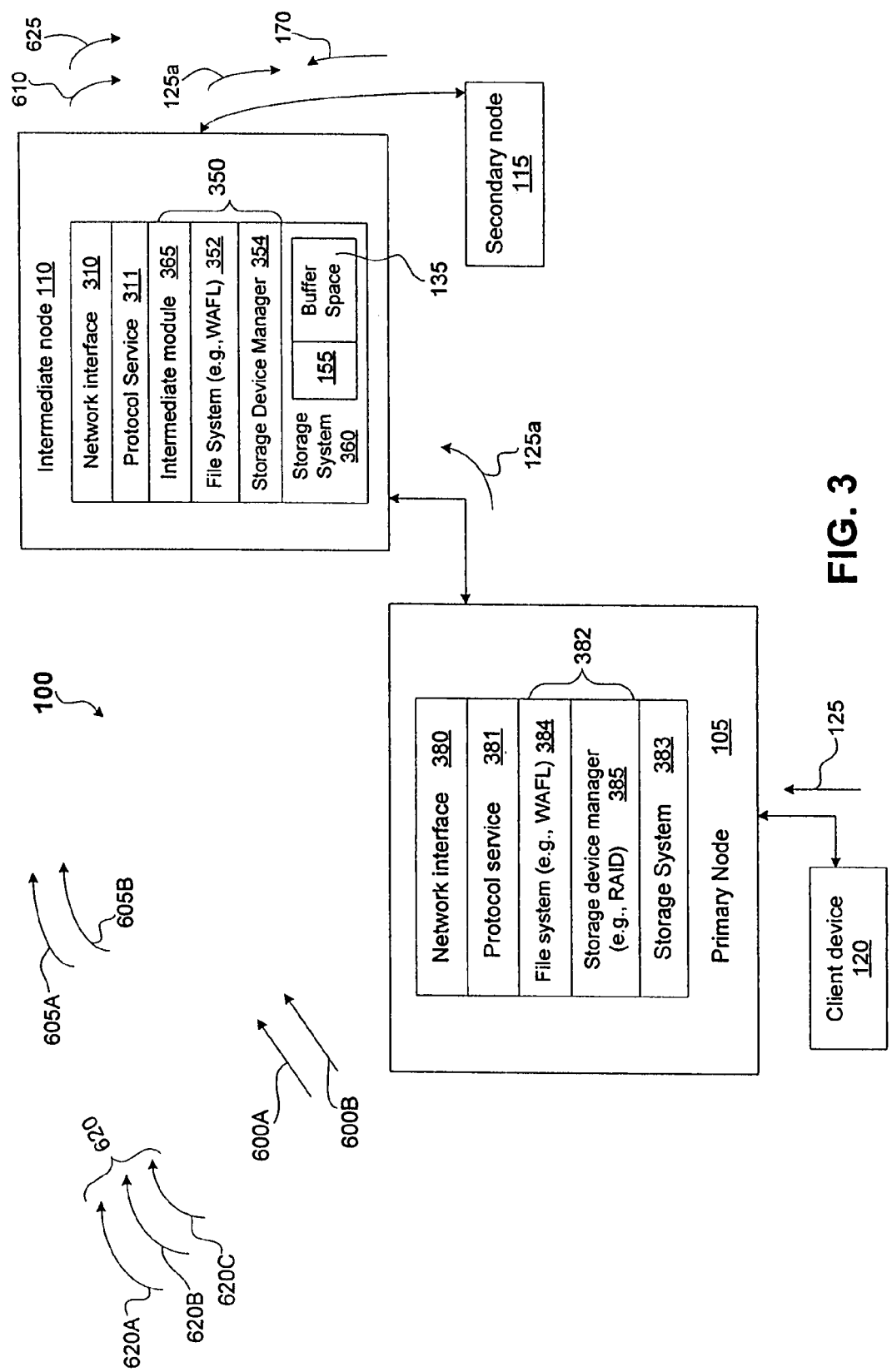
FIG. 3 is a block diagram that shows additional details of the intermediate node, in accordance with an embodiment of the invention.

FIG. 3 is a block diagram that shows additional details of the intermediate node 110, in accordance with an embodiment of the invention. In an embodiment of the invention, the intermediate node 110 includes a network interface 310, a protocol service 311, a storage operating system 350 with the standard networking stacks and file system stacks, and a storage system 360. The storage operating system 350 may further include a file system 352 and a storage device manager 354. As one example, the storage operating system 350 may be of the type known as DATA ONTAP™ which is commercially available from NETWORK APPLIANCE, INCORPORATED. The functionalities of the network interface 310, protocol service 311, storage operating system 350, and storage system 360 are further discussed below.

In an embodiment of the invention, the storage operating system 350 further includes an intermediate module 365 that processes and manages the incoming data stream (e.g., data 125*a*) from the primary node 105, manages the buffer space 135, buffers the incoming data stream 125*a* into the buffer space 135, and forwards the data 125*a* from the buffer space 135 to the secondary node 115.

Typically, the intermediate module 365 straddles the network layer and the file system layer in the storage operating system 350. The data 125*a* that is received from the primary node 105 is placed in the file system 352, buffered in the buffer space 135 in the storage system 360, and then eventually forwarded to the secondary node 115. By buffering the data 125*a* that is received from the primary node 105 and then forwarding the buffered data 125*a* to the secondary node 115, the intermediate module 365 reduces the latency problem of previous approaches.

The storage system 360 provides the memory space for the buffer space 135. The storage system 360 may include one or more storage devices.

Components of the intermediate node 110 may be implemented in hardware, software, and/or firmware. For example, the intermediate node 110 may be a computer having one or more processors running computer-readable program code of the storage operating system 350 in memory. Software components of the intermediate node 110 may be distributed on computer-readable storage media (e.g., CD-ROMS, tapes, disks, ZIP drive, and/or another type of storage media) or transmitted over wired or wireless link by a device connected to the intermediate node 110. Note that other standard hardware (e.g., ports, memories, processors, and other hardware), standard software, and standard firmware components that permit the intermediate node 110 (and the nodes 105 and 115) to perform standard computing or packet processing operations are not shown in FIG. 3, in order to focus on the details in the embodiments of the invention.

The network interface 310 includes components for receiving and sending storage-related service requests over the network, to and from the primary node 105, and to and from the secondary node 115. The protocol service 311 parses and services the received requests. The protocol service 311 can support various types of network communication protocols such as, for example, Network File System (NFS), Common Internet File System (CIFS), Hypertext Transfer Protocol (HTTP), TCP/IP, and/or other network protocols. The network interface 310 and protocol service 311 will then forward a received service request to the storage operating system 350 (including the intermediate module 365). For example, data 125*a* (which is transmitted by the primary node 105 to the intermediate node 110) will be sent by the intermediate module 365 to the buffer space 135 for buffering. The intermediate module 365 selects the memory space in the buffer space 135 for buffering the data 125*a*, and the file system 352 will write the data 125*a* into the buffer space 135. The file system 352 manages files that are stored in storage system 360. In one embodiment, the file system 352 organizes files in accordance with the Write-Anywhere-File Layout (WAFL) as disclosed in the following commonly-assigned disclosures, which are hereby fully incorporated herein by reference: U.S. Pat. No. 6,289,356, U.S. Pat. No. 5,963,962, and U.S. Pat. No. 5,819,292. However, the invention is not so limited in accordance with WAFL, and an embodiment of the invention may also be used with other file systems and layouts. For example, an embodiment of the invention may be used with SANs or other block-based systems, or combined SAN/NAS systems.

The data stream from the primary node 105 is typically represented as a file in the buffer space 135.

The file system 352 will then read the buffered data 125*a* from the buffer space 135, and the intermediate module 365 will then forward the data 125*a* from the buffer space 135 to the secondary node 115. The data 125*a* is then stored in the secondary node 115.

The storage device manager 354 assists the file system 352 in managing the storage devices in the storage system 360. The storage device manager 354 receives read and write commands from the file system 352 and processes the commands by accordingly accessing the storage system 360.

The size of the buffer space 135 may vary depending on how much outage is desired to be tolerated. For example, if an outage of approximately 60 seconds is to be tolerated, and assuming that approximately 50 megabytes of data per second can be sent to the intermediate node 110, then the buffer space 135 will have a size of approximately 3000 megabytes (50 megabytes/second×60 seconds). Therefore, the size of stable storage (buffer space 135) required at the intermediate node 110 is not related to the size of the user data. Rather, the size of the stable storage is normally a function usually of the latency/jitter of communication between the intermediate node 110 and secondary node 115 and of the throughput of the primary node 105.

The primary node 105 includes a network interface 380, a protocol service 381, a storage operating system 382, and a storage system 383. The secondary node 105 includes similar components, but these similar components are not shown in FIG. 3. The storage operating system 382 may further include a file system 384 and a storage device manager 385. The storage system 383 may include one or more storage devices. Components of the primary node 105 may be implemented in hardware, software, and/or firmware. For example, the primary node 105 may be a computer having one or more processors running computer-readable program code of the storage operating system 382 in memory. Software components of the primary node 105 may be distributed on computer-readable storage media (e.g., CD-ROMS, tapes, disks, ZIP drive, and/or another type of storage media) or transmitted over wired or wireless link by devices connected to the primary node 105.

The network interface 380 includes components for receiving storage-related service requests over a network from, for example, a connected device and for sending storage-related service requests to connected devices. A protocol service 381 parses and services the received requests. The protocol service 381 can support various types of network communication protocols such as, for example, Network File System (NFS), Common Internet File System (CIFS), Hypertext Transfer Protocol (HTTP), TCP/IP, and/or other network protocols. The network interface 380 and protocol service 381 will forward a received service request to the storage operating system 382, which processes the request by reading data from the storage system 383 in the case of a read request, or by writing data to the storage system 383 in the case of a write request. Data read from the storage system 383 are transmitted over the network to the requesting client device 120. Similarly, data to be written to the storage system 383 are received over network from a client device 120 and written by the file system 384 into the storage system 383, and a copy of this data is forwarded by the file system 384 to the intermediate node 110.

The storage device manager 385 manages the storage devices in the storage system 383. The storage device manager 385 receives read and write commands from the file system 384 and processes the commands by accordingly accessing the storage system 383. In one embodiment, the storage device manager 385 manages storage devices in accordance with RAID (Redundant Array of Independent, or Inexpensive, Disks).

The file system 384 manages files that are stored in storage system 383. In one embodiment, the file system 384 organizes files in accordance with the Write-Anywhere-File Layout (WAFL) as disclosed in the following commonly-assigned disclosures: U.S. Pat. No. 6,289,356, U.S. Pat. No. 5,963,962, and U.S. Pat. No. 5,819,292. However, the invention is not so limited in accordance with WAFL, and an embodiment of the invention may also be used with other file systems and layouts. For example, an embodiment of the invention may be used with SANs or other block-based systems.

The storage operating system 382 receives data 125 from the client device 120, and stores the data 125 into the storage system 383. The storage operating system 382 will also forward a copy 125a of the data 125 to the intermediate node 110, and the data copy 125a is buffered in the buffer space 135 as discussed above.

Operation in Synchronous Mode

Synchronous mode refers to the steady state where the primary node 105 and the intermediate node 110 are in data synchrony with each other. Synchronous mode can be defined in precise terms as follows. Synchronous mode occurs when every data (i.e., user data) 125 (which has been committed (performed) at the primary node 105) has also been acknowledged to a client 120 by either logging the user data 125 in stable storage (i.e., buffer space 135) at the intermediate node 110, or the user data 125 has been copied by the intermediate node and committed at the secondary node 115. Logging the user data 125 means that the intermediate node 110 has recorded the user data 125 in the buffer space 135 so that the user data 125 in the data stream is no longer volatile when a failure event occurs.

In this mode operation, each user data 125 requested at the primary node 105 is performed as follows:

Step (1): each user data 125 is performed locally at the primary node 105, and the user data 125 is stored in the storage system 383 in the primary node 105.

Step (1a): step (1a) is typically performed concurrently with step (1). The user data 125 (or a copy 125a of the user data 125) is forwarded to the intermediate node 110.

Step (2): The intermediate node 110 logs (stores) the user data 125 to stable storage (buffer space 135). This step (2) involves buffering the user data 125 (or buffering the copy 125a of the user data 125).

Step (3): Upon completion of step (2), the intermediate node 110 sends an acknowledgement 140 (FIG. 1) to the primary node 105.

Step (4): Upon receipt of acknowledgement 140 by the primary node 105 from the intermediate node 110, the primary node 105 acknowledges to the client device 120 that the user data 125 has been stored in the intermediate node 110. For example, the primary node 105 can forward the acknowledgement 140 to the client device 120 to acknowledge the completion of the storage of the user data 125.

At the intermediate node 110, further processing of the user data 125 logged (stored) to stable storage takes place as follows:

Step (1): At any point after receipt of a data 125 by the intermediate node 110 from the primary node 105, the data 125 is stored in the buffer space 135 and also forwarded by the intermediate node 110 to the secondary node 115.

Step (2): The secondary node 115 commits (stores) the data 125 at the secondary node 115. This step (2) involves storing user data 125 into the storage system of the secondary node 115.

Step (3): The secondary node 115 then sends an acknowledgement 170 back to the intermediate node 110. A storage operating system in the secondary node 115 (not shown in FIG. 3) is configured to send the acknowledgement 170.

Step (4): Upon receipt of the acknowledgement 170 by the intermediate node 110, the intermediate node 110 removes the data 125 from the buffer space 135. Typically, the data 125 is stored in the buffer space 135. The intermediate module 365 is configured to detect the acknowledgement 170 from the secondary node 115 and to remove the data 125 from the buffer space 135.

Thus the intermediate node 110 can be seen as performing a store and forward functionality. Typically, data 125 are logged and relayed by the intermediate node 110 to the secondary node 115 in the order that the data 125 were received from the primary node 105.

Note also that the intermediate node 110 typically requires very little computing power. The intermediate node 110 does not actually perform additional processing of the user data 125. Instead, the intermediate node 110 merely logs the user data 125 by buffering the user data 125.

Operation in the Asynchronous Mode

The asynchronous mode is defined to be the state where the primary node 105 has committed (stored) and acknowledged user data 125 which have not been committed (stored) to the secondary node 115 and have not been logged (stored) into the intermediate node 110. This operation permits data to be copied from the primary node 105 to the secondary node 115 when the intermediate node 110 is not functioning, and therefore provides a response by the system 100 for tolerating a failure occurrence in the intermediate node 110. In an embodiment of the invention, in the asynchronous mode, the storage operating system 382 in the primary node 105 (and the storage operating system in the secondary node 115) permit the primary node 105 and secondary node 115 to directly communicate with each other when there is an outage in the intermediate node 110. By this direct communication between the nodes 105 and 115, the primary node 105 can transmit its stored data set 160a (FIG. 1) to the secondary node 115, so that the secondary node 115 can store the data set 160a as a backup copy 160b.

As one of various options, the transactions 152 (FIG. 1) via a link 150 between the primary node 105 and the secondary node 115 may be, for example, compressed and/or encrypted (end-end), in accordance with standard compression or encryption techniques.

In the asynchronous mode, the primary node 105 negotiates directly with the secondary node 115 and manages the transition from the asynchronous mode to the synchronous mode. Once the synchronous mode is reentered, the intermediate node 110 can be automatically reintroduced into the data path between the primary node 110 and the secondary node 115.

Note that an embodiment of the invention may perform an automatic split mode of operation, where in a network outage, then the primary node 105 and secondary node 115 will break their mirroring relationship (so that data is temporarily not mirrored from primary node 105 to secondary node 115), and the primary node 105 will continue to receive and store data from a client(s) 120. Therefore, the data service to the client(s) is not disrupted. The primary node 105 can then communicate directly with the secondary node 115 so that the data set in the primary node 105 becomes synchronous with the data set in the secondary node 115. Note that the automatic split mode differs from a manual split mode as follows. In the manual split mode, a primary node will not accept data from a client(s), if the primary node is not able to successfully communicate with a secondary node.

Tolerating Network Outages

There are two kinds of network outages which may affect this scheme provided by the system 100 in FIG. 1. The first type of network outage is when the network outage occurs in a link between intermediate node 110 and secondary node 115, or the network outage can also occur due to the failure of the secondary node 115. Note that the primary node 105 does not detect the loss of connectivity between the secondary node 115 and the intermediate node 110. The intermediate node 110 informs the primary node 105 about this type of loss of connectivity (if the loss of connectivity occurs beyond a predetermined time period).

Brief outages in the above cases can be handled by buffering at the intermediate node 110. The primary node 105 keeps sending transactions to the intermediate node 110, and the intermediate node 110 will buffer the data from the primary node 110 and will pretend that the above synchronous mode still applies, even though connection between the intermediate node 110 and secondary node 115 has been lost. The intermediate node 110 can then later send the buffered data to the secondary node 115, after the connection between the intermediate node 110 and secondary node 115 has been restored (or after the secondary node 115 has been restored after failure). As long as the buffer(s) 135 assigned to a given pair of primary node 105 and secondary node 115 does not overflow (which may occur during a brief network outage), data storage service can be continued without entering into an "asynchronous mode". In the asynchronous mode of operation, the primary node 105 will communicate directly with the secondary node 115 as discussed above.

To tolerate a reboot/power-cycle of the secondary node 115 without reverting to the asynchronous mode of operation, sufficient buffer space 135 should be allocated at the intermediate node 110, in order to be able to buffer data at the intermediate node 110 for the duration of the reboot/power-cycle.

The second type of network outage is when the network outage occurs in a link between the primary node 105 and intermediate node 110. The storage operating system 382 in the primary node 105 can be configured to detect this type of network outage, for example, if the intermediate node 110 does not reply to a query from the primary node 105 after a predetermined time period. Normally, in this second type of network outage, the primary node 105 will enter into the asynchronous mode, where the primary node 105 will communicate directly with the secondary node 115 as discussed below.

Tolerating Machine Outages

Machine outage occurs when at least one of the three major components in FIG. 1 (primary node 105, intermediate node 110, and secondary node 115) suffers an outage. Note that an outage of the primary node 105 will prevent any user data 125 from the client device 120 from being written into the primary node 105. Discussed below are methods for tolerating an outage in the intermediate node 110 and an outage in the secondary node 115, so that data 125 that is written into the primary node 105 is eventually copied into the secondary node 115. Note also that the below methods do not cover the case when the primary node 105 is subject to an outage. When an outage occurs in the primary node 105, the primary node 105 is not able to receive data 125 from a client device 120. Therefore, there is no existing data 125 that is to be copied from the primary node 105 to the intermediate node 110 and then to the secondary node 115, in this case when the primary node 105 has an outage.

In case when the intermediate node 110 fails, the primary node 105 will enter into the asynchronous mode, where the primary node 105 will directly communicate with the secondary node 115 so that the primary node 105 will directly transmit data to the secondary node 115 and the transmitted data is then stored in the secondary node 115. The storage operating system 382 in the primary node 105 can be configured to detect this type of machine outage.

The case when the secondary node 115 fails is treated in a similar manner as the case where the connectivity between the intermediate node 110 and secondary node 115 is lost, as previously discussed above. Therefore, when the secondary node 115 fails, the intermediate node 110 will continue to buffer the data received from the primary node 105 and will transmit the buffered data to the secondary node 115 when the secondary node 115 is repaired, as discussed above.

The intermediate module 365 handles the network outages that may occur in the system 100. Note that some network outages can be tolerated without disrupting services in the system 100. Therefore, the buffer space 135 can continue to store data 125a from the primary node 105 if there is sufficient memory space in the buffer space 135, in situations where the intermediate node 110 is not able to forward the buffered data to the secondary node 115. Therefore, the size of the buffer space 135 determines the length of time that network outages can be tolerated by the intermediate node 110 and/or amount of data received by the intermediate node 110 during a network outage. Larger sizes of the buffer space 135 permit the intermediate node 110 to tolerate a relatively longer length of the network outages and/or receive a relatively larger amount of data during a network outage. In an embodiment of the invention, when there is not sufficient memory space in the buffer space 135 to receive new data 125a during a network outage, the intermediate module 365 will inform the primary node 105 to stop sending data 125a to the intermediate node 110.

Figure 4:
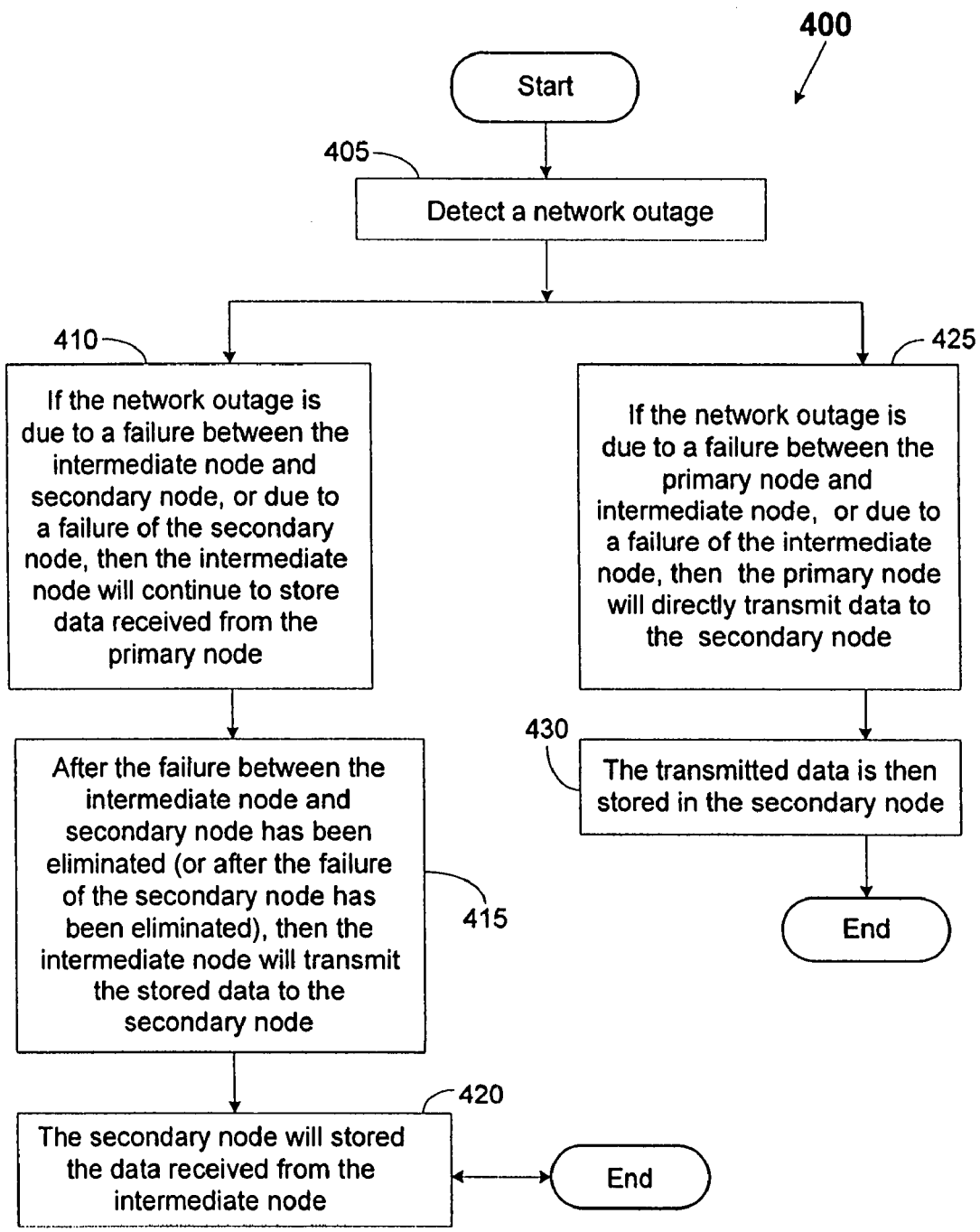
FIG. 4 is a flowchart of a method for tolerating network outages, in accordance with an embodiment of the invention.

FIG. 4 is a flowchart of a method 400 for tolerating network outages, in accordance with an embodiment of the invention. In block 405, a network outage is detected. For example, the storage operating system 382 in the primary node 105 can detect a failure between the intermediate node 110 and the secondary node 115 or can detect a failure of the intermediate node 110, if the storage operating system 382 in the primary node 105 is not able to communicate with the storage operating system 350 in the intermediate node 110. The storage operating system 350 in the intermediate node 110 can detect a failure between the intermediate node 110 and the secondary node 115 or can detect a failure of the secondary node 115, if the storage operating system 350 in the intermediate node 110 is not able to communicate with the storage operating system (not shown in FIG. 3) in the secondary node 115.

In block 410, if the network outage is due to a failure between the intermediate node 110 and the secondary node 115, or due to a failure of the secondary node 115, then the intermediate node 110 will continue to store data 125a that is received from the primary node 105.

In block 415, after the failure between the intermediate node 110 and secondary node 115 has been eliminated (or after the failure of the secondary node 115 has been eliminated), then the intermediate node 110 will transmit the stored (buffered) data 125a to the secondary node 115.

In block 420, the secondary node 115 will store the data 125a that is received from the intermediate node 110.

On the other hand, in block 425, if the network outage is due to a failure between the primary node 105 and intermediate node 110, or due to a failure of the intermediate node 110, then the primary node 105 will directly transmit the data 125a to the secondary node 115.

In block 430, the data 125a that is transmitted from the primary node 105 is then stored in the secondary node 115.

Sharing of the Intermediate Node 110

Figure 5:
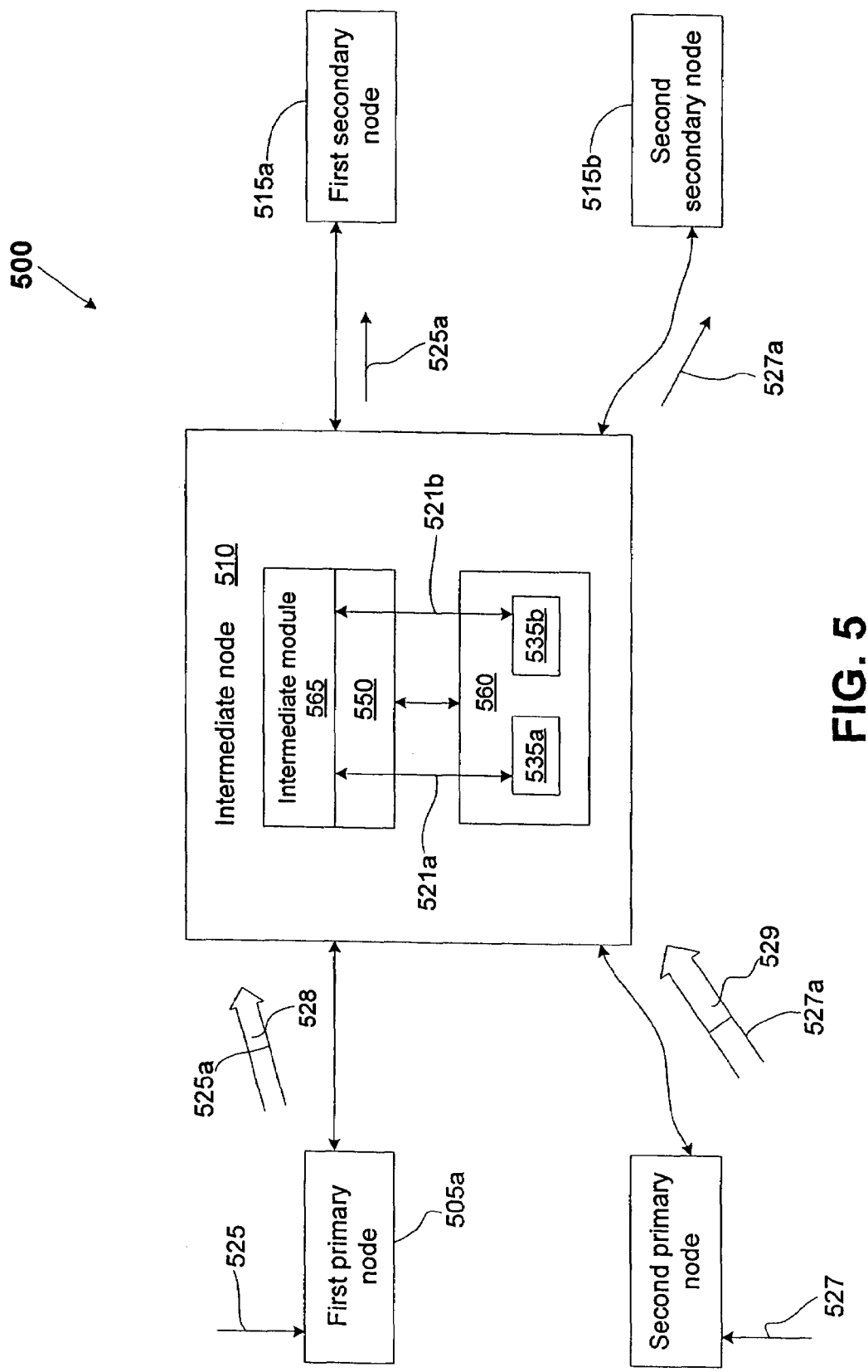
FIG. 5 is a block diagram of a system, in accordance with another embodiment of the invention.

FIG. 5 is a block diagram of a system 500, in accordance with another embodiment of the invention. The system 500 includes multiple primary nodes and multiple secondary nodes, with a single intermediate node 510 connected between each pair of primary node and secondary node. In the example of FIG. 5, primary nodes 505a and 505b and secondary nodes 515a and 515b are connected to the intermediate node 510. However, the number of primary nodes and secondary nodes in the system 500 may vary.

A buffer space is associated with each pair of primary node and secondary node. For example, a thread 521a in the intermediate module 565 would manage the buffer space 535a and data transmitted between the pair of primary node 505a and secondary node 515a. A thread 521b in the intermediate module 565 would manage the buffer space 535b and data transmitted between the pair of primary node 505b and secondary node 515b. Therefore, a single device (intermediate node 510) may be able to perform the intermediary data buffering role, as described above, for multiple sets of primary nodes 505 and secondary nodes 515.

As an example operation, data 525a that is transmitted from primary node 505a is buffered by the thread 521a into the buffer space 535a. The data 525a is a copy of a data 525 that was written to the node 505a by, for example, a client device 120. The thread 521a will then forward the data 525a to the secondary node 515a. The secondary node 515a will then store the data 525a. The thread 521a identifies the data 525a based upon the packet header information 528 (of the data 525a) indicating that the destination address of the data 525a is the secondary node 515a.

Data 527b that is transmitted from primary node 505b is buffered by the thread 521b into the buffer space 535b. The data 527b is a copy of a data 527 that was written to the node 505b by, for example, a client device 120. The thread 521b will then forward the data 527b to the secondary node 515b. The secondary node 515b will then store the data 527b. The thread 521b identifies the data 527b based upon the packet header information 529 (of the data 527b) indicating that the destination address of the data 527b is the secondary node 515b.

One application of the embodiment in FIG. 5 is by placing an intermediate node 510 at, for example, a data center that is managed by an internet service provider. The intermediate node 510 could be shared and used by different customers, where each pair of primary node and secondary node is associated with a different customer. Quality of service for each primary-node/secondary-node set that share the intermediate node 510 can be achieved by limiting the network bandwidth that any primary node 505 can transmit data. This can be achieved by use standard networking protocols. Also, each primary-node/secondary-node set is assigned to a certain buffer space 535 (stable storage). Additionally, fairness in servicing requests from each primary node 505 can be achieved by use of, for example, known methods (e.g., round-robin).

Other features discussed in the system 100 of FIG. 1 (e.g., acknowledgement message 140 and/or confirmation message 170, and/or other features) can also be included in the system 500 in FIG. 5.

The intermediate node and the above data buffering method in the intermediate node may be used in, for example, a synchronous mirroring system, although embodiments of the invention are not required to be used in synchronous mirroring systems. One example of a synchronous mirroring system is of the type known as SYNC SNAPMIRROR™ (SLIDERULER™) which is commercially available from NETWORK APPLIANCE, INCORPORATED. The intermediate node and data buffering method in the intermediate node may be used in other types of data storage systems that do not necessarily have the synchronous mirroring feature. Additionally, an embodiment of the invention is not limited to use of any particular data format. Any suitable data format may be used for the data streams that are buffered in the intermediate node.

Ordering of Updates from the Intermediate Node 110 to the Secondary Node 115:

As noted, the intermediate node 110 (FIG. 3) can buffer updates from the primary node 105 and then send the updates asynchronously to the secondary node 115. In this operation, however, typically the intermediate node 110 must (in some cases) follow the ordering rules as follows. If the intermediate node 110 receives two updates 600A and 600B (FIG. 3) in that order, then if the secondary node 115 has received the update 600B from the intermediate node 110, then the secondary node 115 must also have received the update 600A from the intermediate node 110. This is known as the causal ordering of the updates and is important for data consistency. The storage operating system (not shown in FIG. 3) of the secondary node 115 performs the updates in the order that they were received from the intermediate node 110.

Batching of Updates from the Intermediate Node 110 to the Secondary Node 115:

Furthermore, as an option, the intermediate node 110 can batch the updates by taking advantage of overwrites. If there are two transactions 605A and 605B (FIG. 3), both of which overwrite the same location in the storage system 383 in the primary node 105, then the intermediate node 110 can batch these two updates 605A and 605B and forward a single update 610 to the secondary node 115 with the result of the last transaction 605B. Therefore, the single update 610 reflects the last update 605B. This method can substantially reduce the traffic between the intermediate node 110 and the secondary node 115. The storage operating system 350 in the intermediate node 110 batches the updates 605A and 605B and forwards the single update 610 to the secondary node 115.

Ordering and Batching Through Consistency Points:

As another option, one technique to provide both batching and ordering is the notion of consistency points/epochs. In this scheme, the storage operating system 350 in the intermediate node 110 defines points in time $t_A$, $t_B$, $t_C$, etc., and all updates 620 from, for example, the time point from time $t_A$ to time $t_B$ are batched by the storage operating system 350 and sent from the intermediate node 110 to the secondary node 115 in one large transfer (aggregated update 625). Therefore, this one large transfer 625 will include all of the updates 620 received by the intermediate node 110 from the primary node 105, from time $t_A$ to time $t_B$. The secondary node 115 will take this large transfer 625 and then apply it atomically to its storage system. Thus the secondary node 115 will move forward atomically from time period $t_A$ to time period $t_B$ (i.e., the data received in the secondary node 115 will include all of the data updates received by the intermediate node 110 from time period $t_A$ to time period $t_B$). As an example, assume that from the time $t_A$ to time $t_B$, an update 620A will write data (denoted DATA#1) at a first location in the buffer space 135, an update 620B will write data (denoted DATA#2) at a second location in the buffer space 135, and an update 620C will write data (denoted DATA#3) at a third location in the buffer space 135. The transfer 625 will then forward and write the DATA#1, DATA#2, and DATA#3 at different locations in the storage devices in the secondary node 115. This scheme can be implemented using, for example, WAFL SNAPSHOTS™ and SNAPRESTORE® (which are products commercially available from NETWORK APPLIANCE, INC.) and lets the system 100 combine ordering and batching into one solution.

The larger the time gap between the consistency points (e.g., from time period $t_A$ to time period $t_B$), the more efficiency of batching. But this larger time gap will require more buffer spaces 135 at the intermediate node 110. In general, this scheme will typically require a buffer space 135 at least twice the space required to buffer updates during the time interval for a consistency point.

Various elements in the drawings may be implemented in hardware, software, firmware, or a combination thereof.

The various engines, software, or modules discussed herein may be, for example, computer software, firmware, commands, data files, programs, code, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing disclosure. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of an embodiment of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It is also noted that the various functions, commands, modules (e.g., "intermediate node"), variables, or other parameters shown in the drawings and discussed in the text have been given particular names for purposes of identification. However, the function names, variable names, or other parameter names are only provided as some possible examples to identify the functions, variables, or other parameters. Other function names, variable names, or parameter names may be used to identify the functions, variables, or parameters shown in the drawings and discussed in the text.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for copying data in nodes in a network, the method comprising:
   sending data from a client device to a primary node;
   sending the data synchronously from the primary node to an intermediate node;
   receiving, by the intermediate node, the data from the primary node, wherein the intermediate node includes an active file system for maintaining the data;
   buffering the data temporarily in a buffer space in the intermediate node until the data is subsequently copied to a secondary node;
   sending an acknowledgement message from the intermediate node to the primary node in response to buffering the data in the intermediate node, wherein the intermediate node sends the acknowledgement message to the primary node regardless of whether the data has been forwarded to the secondary node;
   sending the acknowledgement message from the primary node to the client device;
   receiving, by the client device, the acknowledgement message;
   performing, by the client device, an operation in response to the acknowledgement message;

placing the intermediate node within a predefined distance associated with the primary node to reduce a latency associated with transmitting the acknowledgement message to the client;

forwarding, asynchronously, the data to the secondary node after the intermediate node sends the acknowledgement message to the primary node;

sending a confirmation message from the secondary node to the intermediate node, in order to indicate that the data has been stored in the secondary node, and in response to the confirmation message, deleting the data in the intermediate node;

storing the data in the secondary node, wherein the data is a subset of a data set stored in the primary node, wherein the data set in the primary node is backed up in the secondary node;

defining a time point from $t_A$ to time $t_B$;

batching all updates that are received by the intermediate node during the time point into an aggregated update; and sending the aggregated update to the secondary node.

2. The method of claim 1, further comprising:
sending the data to the primary node via a write request from a client device.

3. The method of claim 1, further comprising:
sending the acknowledgement message from the intermediate node to the primary node; and
forwarding the acknowledgement to the client device, wherein the acknowledgement message indicates that the intermediate node has stored the data.

4. The method of claim 1, wherein the data is synchronously copied from the primary node to the intermediate node.

5. The method of claim 1, wherein the data is asynchronously copied from the intermediate node to the secondary node.

6. The method of claim 1, wherein the primary node provides data storage services over a network.

7. The method of claim 1, wherein the secondary node provides data storage services over a network.

8. The method of claim 1, wherein the secondary node is located at a site that is remote from the primary node.

9. The method of claim 1, wherein the intermediate node is located between the primary node and secondary node.

10. The method of claim 1, further comprising:
providing direct communication between the primary node and the secondary node when the intermediate node is not available for communication in the network.

11. The method of claim 1, further comprising:
receiving, by the intermediate node, a first update from the primary node and a second update from the primary node; and
receiving, by the secondary node, the second update if the secondary node had previously received the first update.

12. The method of claim 1, further comprising:
receiving, by the intermediate node, a first update in a particular buffer space in the intermediate node and a second update in the particular buffer space in the intermediate node; and
forwarding, by the intermediate node, the second update to the secondary node.

13. A method for copying data in nodes in a network, the method comprising:
sending data from a client device to a first primary node;
sending the data synchronously from the first primary node to an intermediate node;

receiving, by the intermediate node, the data from the first primary node, wherein the intermediate node includes an active file system for maintaining the data, the intermediate node stores a subset of data from the primary node, and wherein the subset of data includes the data copied to the first node, and wherein a dataset in the primary node is backed up in the secondary node; buffering the data temporarily in a first buffer space in the intermediate node until the data is subsequently copied to a first secondary node;

sending an acknowledgement message from the intermediate node to the first primary node in response to buffering the data in the intermediate node, wherein the intermediate node sends the acknowledgement message to the first primary node regardless of whether the data has been forwarded to the secondary node;

sending the acknowledgement message from the first primary node to the client device;

receiving, by the client device, the acknowledgement message;

performing, by the client device, an operation in response to the acknowledgement message;

placing the intermediate node within a predefined distance associated with the primary node to reduce a latency associated with transmitting the acknowledgement message to the client;

forwarding, asynchronously, the data to the first secondary node after the intermediate node sends the acknowledgement message to the first primary node;

receiving, synchronously, other data from a second primary node by the intermediate node;

buffering the other data temporarily in a second buffer space in the intermediate node until the other data is subsequently copied to a second secondary node;

sending a second acknowledgement message from the intermediate node to the second primary node in response to buffering the other data in the intermediate node, wherein the intermediate node sends the second acknowledgement message to the second primary node regardless of whether the data has been forwarded to the second secondary node;

sending the second acknowledgement message from the second primary node to a second client device;

receiving, by the second client device, the second acknowledgement message;

performing, by the second client device, a second operation in response to the second acknowledgement message;

forwarding, asynchronously, the other data to the second secondary node;

sending a confirmation message from the secondary node to the intermediate node, in order to indicate that the data has been stored in the secondary node, and in response to the confirmation message, deleting the data in the intermediate node;

defining a time point from time $t_A$ to time $t_B$;

batching all updates that are received by the intermediate node during the time point into an aggregated update; and sending the aggregated update to the first secondary node or the second secondary node as appropriate.

14. The method of claim 13, further comprising:
storing the data in the first secondary node.

15. The method of claim 13, further comprising:
storing the other data in the second secondary node.

16. The method of claim 13, wherein the data stored in the first buffer space is a subset of the data set that is stored in the first primary node.

17. The method of claim 13, wherein the other data stored in the second buffer space is a subset of the data set that is stored in the second primary node.

18. The method of claim 13, wherein the data is a copy of a data written to the first primary node.

19. The method of claim 13, wherein the other data is a copy of a data written to the second primary node.

20. An apparatus for copying data in nodes in a network, the apparatus comprising:
a client device configured to send data;
a primary node including means for receiving data from the client device;
an intermediate node including means for synchronously receiving and for buffering the data from the primary node, wherein the intermediate node includes an active file system for maintaining the data, the intermediate node stores a subset of data from the primary node, and wherein the subset of data includes the data copied to the first node, and wherein a dataset in the primary node is backed up in the secondary node; wherein the intermediate node buffers the data temporarily until the data is subsequently copied to a secondary node;
wherein the intermediate node includes means for sending an acknowledgement message to the primary node in response to buffering the data in the intermediate node, further wherein the intermediate node sends the acknowledgement message to the primary node regardless of whether the data has been forwarded to the secondary node;
wherein the primary node includes means for sending the acknowledgement message from the primary node to the client device;
wherein the client device includes means for receiving the acknowledgement message from the primary node;
wherein the client device includes means for performing an operation in response to the acknowledgement message;
wherein the client device receives the acknowledgement message and performs an operation in response to the acknowledgement message;
wherein the intermediate node reduces a latency between sending of the data from the client device and receiving of the acknowledgement message by the client device;
wherein the intermediate node includes means for asynchronously forwarding the data to the secondary node after the intermediate node sends the acknowledgement message to the primary node;
wherein the intermediate node includes means for sending a confirmation message from the secondary node to the intermediate node, in order to indicate that the data has been stored in the secondary node, and in response to the confirmation message, deleting the data in the intermediate node;
wherein the secondary node includes means for storing the data, wherein the data is a subset of a data set stored in the primary node, and wherein the dataset in the primary node is backed up in the secondary node;
wherein the intermediate node further includes means for:
defining a time point $t_A$ to time $t_B$,
grouping all updates that are received by the intermediate node during the time point into an aggregated update; and
sending the aggregated update to the secondary node.

21. An apparatus for data replication, the apparatus comprising:
a client device configured to send data;
a primary node configure to synchronously receive the data from a client device;
a secondary node; and
an intermediate node configured to receive data from the primary node, to buffer the data temporarily until the data is subsequently copied to the secondary node, and to asynchronously forward the data to the secondary node after the intermediate node sends an acknowledgement message to the primary node, wherein the intermediate node includes an active file system for maintaining data, wherein the secondary node stores the data, wherein the data is a subset of a data set stored in the primary node, and wherein the dataset in the primary node is backed up in the secondary node;
wherein the intermediate node is configured to send an acknowledgement message to the primary node, wherein the primary node is configured to forward the acknowledgement message to a client device, and wherein the acknowledgement message indicates that the intermediate node has stored the data;
wherein the intermediate node sends the acknowledgement message to the primary node in response to buffering the data in the intermediate node, further wherein the intermediate node sends the acknowledgment message to the primary node regardless of whether the data has been forwarded to the secondary node;
wherein the primary node sends the acknowledgement message to the client device;
wherein the client device is configured to receive the acknowledgement message from the primary node;
wherein the client device performs an operation in response to the acknowledgement message;
wherein the intermediate node reduces a latency between sending of the data from the client device and receiving of the acknowledgement message by the client device;
wherein the intermediate node is configured to, asynchronously, forward the data to the secondary node after the intermediate node sends the acknowledgement message to the primary node;
wherein the secondary node is configured to send a confirmation message to the intermediate node, and in order to indicate that the data has been stored in the secondary node, and wherein the intermediate node is configured to delete the data, in response to the confirmation message;
wherein the secondary node includes means for storing the data, wherein the data is a subset of a data set stored in the primary node
wherein the intermediate node is configured to define a time point from time $t_A$ to time $t_B$ to batch all updates that are received by the intermediate node during the time point into an aggregated update, and to send the aggregated update to the secondary node.

22. The apparatus of claim 21, wherein the data is sent to the primary node via a write request from a client device.

23. The apparatus of claim 21, wherein the data is synchronously copied from the primary node to the intermediate node.

24. The apparatus of claim 21, wherein the data is asynchronously copied from the intermediate node to the secondary node.

25. The apparatus of claim 21, wherein the primary node provides data storage services over a network.

26. The apparatus of claim 21, wherein the secondary node provides data storage services over a network.

27. The apparatus of claim 21, wherein the secondary node is located at a site that is remote from a location of the primary node.

28. The apparatus of claim 21, wherein the intermediate node is located between the primary node and the secondary node.

29. The apparatus of claim 21, wherein direct communication is provided between the primary node and the secondary node when the intermediate node is not available for communication in the network.

30. The apparatus of claim 21, wherein the intermediate node is configured to receive a first update from the primary node and a second update from the primary node; and
   wherein the secondary node is configured to receive the second update if the secondary node had previously received the first update.

31. The apparatus of claim 21, wherein the intermediate node is configured to receive a first update in a particular buffer space in the intermediate node and a second update in the particular buffer space in the intermediate node and to forward the second update to the secondary node.

32. An apparatus for data replication, the apparatus comprising:
   a first client device;
   a first primary node coupled to the first client device;
   a second client device;
   a second primary node coupled to the second client device;
   a first secondary node;
   a second secondary node; and
   an intermediate node configured to synchronously receive data from the first primary node, to temporarily buffer the data in a first buffer space in the intermediate node until the data is subsequently copied to the first secondary node, to asynchronously forward the data to the first secondary node after the intermediate node sends an acknowledgement message to the first primary node, to synchronously receive other data from the second primary node, to buffer the other data temporarily in a second buffer space in the intermediate node until the other data is subsequently copied to the second secondary node, and to asynchronously forward the other data to the second secondary node after the intermediate node sends a second acknowledgement message to the second primary node;
   wherein the intermediate node includes an active file system for maintaining the data, wherein the intermediate node stores a subset of data from the primary node, wherein the subset of data includes the data copied to the first node, and wherein a dataset in the primary node is backed up in the secondary node;
   wherein the intermediate node sends the acknowledgement message to the first primary node in response to buffering the data in the intermediate node and wherein the first primary node sends the acknowledgement message to the first client device, further wherein the intermediate node sends the acknowledgement message to the first primary node regardless of whether the data has been forwarded to the first secondary node;
   wherein the first client device performs an operation in response to the acknowledgement message;
   wherein the intermediate node reduces a latency between sending of the data from the first client device and receiving of the acknowledgement message by the first client device;
   wherein the intermediate node sends the second acknowledgement message to the second primary node in response to buffering the other data in the intermediate node and wherein the second primary node sends the second acknowledgement message to the second client device, further wherein the intermediate node sends the second acknowledgement message to the second primary node regardless of whether the data has been forwarded to the second secondary node;
   wherein the second client device performs a second operation in response to the second acknowledgement message, and forwards, asynchronously, the other data to the second secondary node;
   wherein the intermediate node sends a confirmation message from the secondary node to the intermediate node, in order to indicate that the data has been stored in the secondary node, and in response to the confirmation message, deleting the data in the intermediate node;
   wherein the intermediate node defines a time point from time $t_A$ to time $t_B$ and batches all updates that are received by the intermediate node during the time point into an aggregated update, and sends the aggregated update to the first secondary node or the secondary node as appropriate.

33. The apparatus of claim 32, wherein the first secondary node is configured to store the data.

34. The apparatus of claim 32, wherein the second secondary node is configured to store the other data.

35. The apparatus of claim 32, wherein the data stored in the first buffer space is a subset of the data set that is stored in the first primary node.

36. The apparatus of claim 32, wherein the other data stored in the second buffer space is a subset of the data set that is stored in the second primary node.

37. The apparatus of claim 32, wherein the data is a copy of a data written to the first primary node.

38. The apparatus of claim 32, wherein the other data is a copy of a data written to the second primary node.

39. The method of claim 1, wherein the data is synchronously copied from the primary node to the intermediary node after the primary node receives the data from the client, and wherein the data is asynchronously copied from the intermediary node to the secondary node at a time after the intermediary node transmits the acknowledgement message.

* * * * *

UNITED STATES PATENT AND TRADEMARK OFFICE
CERTIFICATE OF CORRECTION

| | | |
|---|---|---|
| PATENT NO. | : 7,631,021 B2 | Page 1 of 1 |
| APPLICATION NO. | : 11/090829 | |
| DATED | : December 8, 2009 | |
| INVENTOR(S) | : Sarma et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 484 days.

Signed and Sealed this

Second Day of November, 2010

David J. Kappos
*Director of the United States Patent and Trademark Office*